(12) United States Patent
Lee et al.

(10) Patent No.: US 11,585,295 B2
(45) Date of Patent: Feb. 21, 2023

(54) ROCKET ENGINE WITH INTEGRATED COMBUSTOR HEAD AND TURBOPUMP

(71) Applicant: KOREA AEROSPACE RESEARCH INSTITUTE, Daejeon (KR)

(72) Inventors: Keum-Oh Lee, Daejeon (KR); Byoungjik Lim, Daejeon (KR); Cheulwoong Kim, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/645,581

(22) Filed: Dec. 22, 2021

(65) Prior Publication Data

US 2022/0205410 A1    Jun. 30, 2022

(30) Foreign Application Priority Data

Dec. 31, 2020    (KR) .......................... 10-2020-0189146

(51) Int. Cl.
*F02K 9/46*    (2006.01)

(52) U.S. Cl.
CPC .......... *F02K 9/46* (2013.01); *F05D 2260/213* (2013.01)

(58) Field of Classification Search
CPC . F02K 9/972; F02K 9/64; F02K 9/563; F02K 9/52; F02K 9/46; F02K 9/42
See application file for complete search history.

(56) References Cited

U.S. PATENT DOCUMENTS

| | | | |
|---|---|---|---|
| 7,418,814 B1* | 9/2008 | Greene | F02K 9/48 60/260 |
| 2014/0260181 A1* | 9/2014 | Soulier | B64G 1/002 60/266 |
| 2020/0088138 A1* | 3/2020 | Goetz | F02K 9/972 |

* cited by examiner

*Primary Examiner* — Todd E Manahan
*Assistant Examiner* — Rodolphe Andre Chabreyrie
(74) *Attorney, Agent, or Firm* — McCoy Russell LLP (57) ABSTRACT

The present disclosure relates to a rocket engine, and more particularly, a rocket engine with an integrated combustor head and turbopump in which a turbopump of the rocket engine is formed integrally with a combustor head.

4 Claims, 5 Drawing Sheets

ROCKET ENGINE WITH INTEGRATED COMBUSTOR HEAD AND TURBOPUMP

CROSS-REFERENCE TO RELATED APPLICATION

The present application claims priority to Korean Patent Application No. 10-2020-0189146, filed on Dec. 31, 2020. The entire contents of the above-listed application are hereby incorporated by reference for all purposes.

TECHNICAL FIELD

The present disclosure relates to a rocket engine, and more particularly, a rocket engine with an integrated combustor head and turbopump in which a turbopump of the rocket engine is formed integrally with a combustor head.

BACKGROUND

A rocket engine is a device which obtains propulsion by injecting an oxidizer and a fuel, which are propellants, into a combustor and combusting the oxidizer and the fuel.

Figure 1:
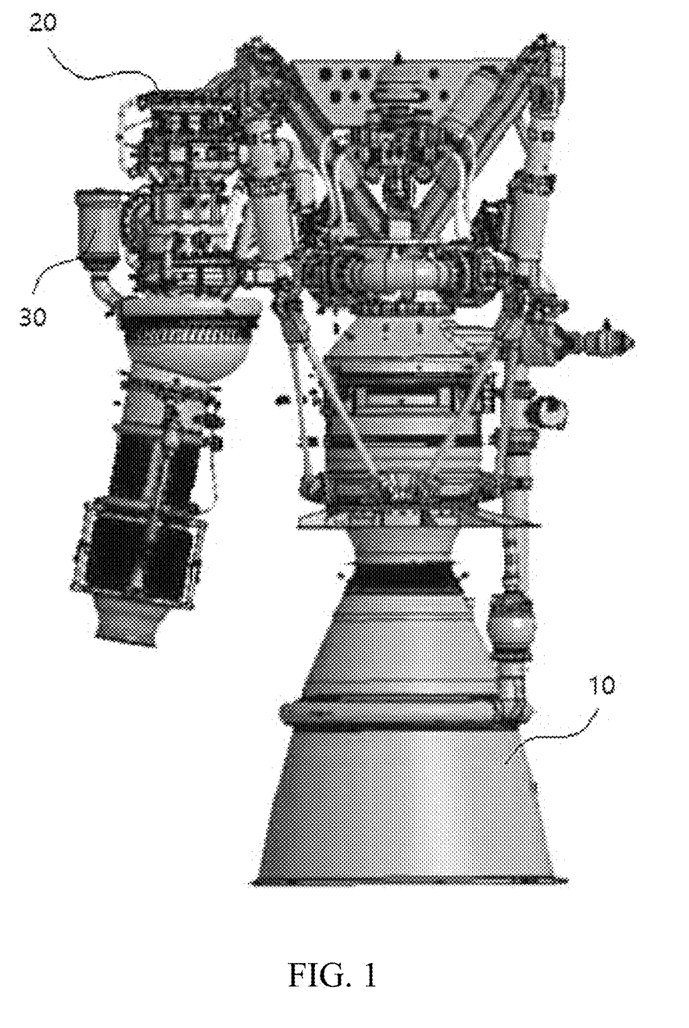
FIG. 1 is a front view illustrating a conventional rocket engine.
Figure 2:
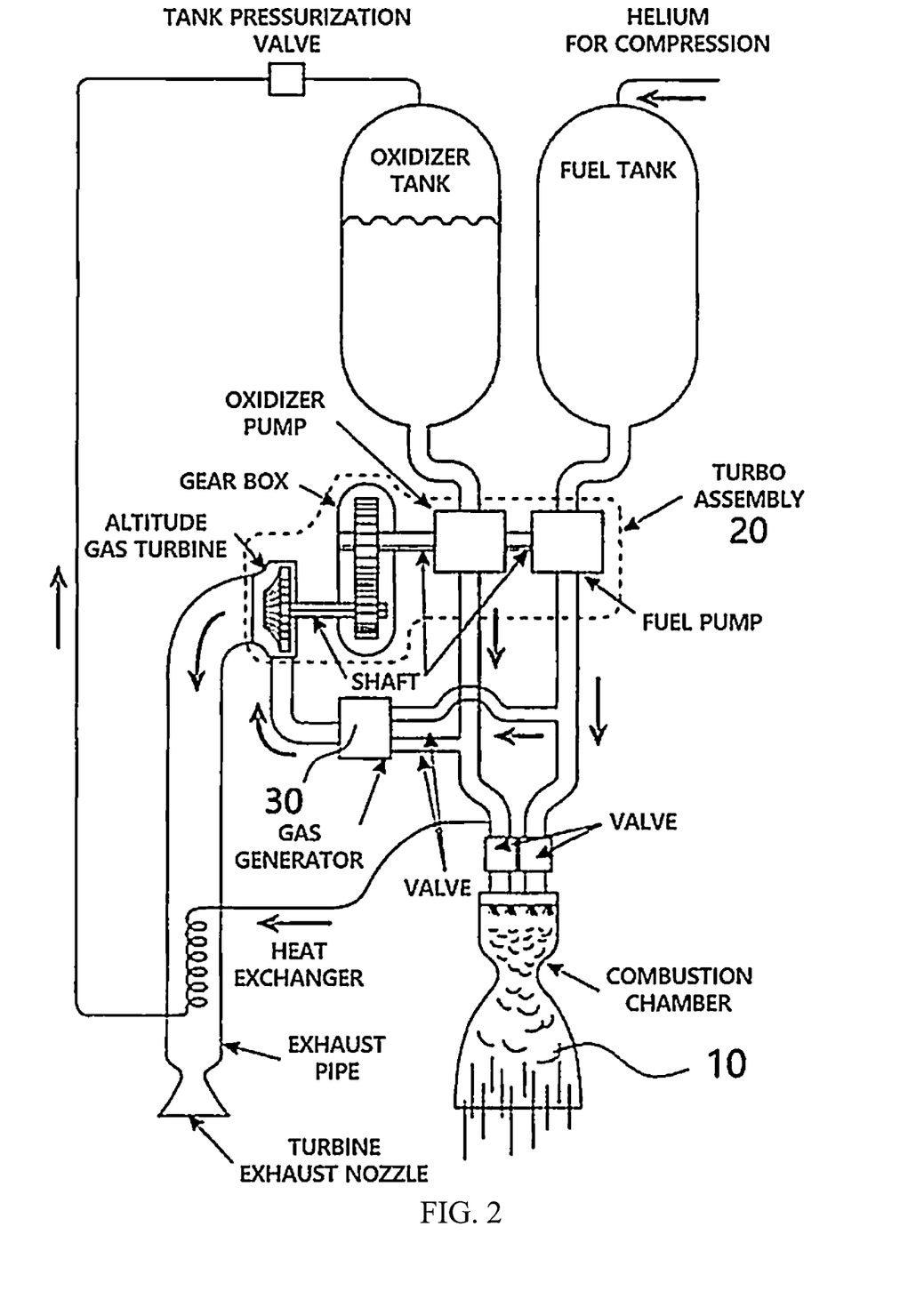
FIG. 2 is a conceptual diagram illustrating the conventional rocket engine.

A general gas generator-type rocket engine includes a thrust chamber 10, a turbopump 20, and a gas generator 30 as illustrated in FIGS. 1 to 2. An oxidizer and a fuel are injected into the thrust chamber 10 and combusted therein, and thus, propulsion of a rocket is generated. The gas generator 30 transmits power to the turbopump 20 for supplying the oxidizer and fuel to the thrust chamber 10. To this end, the gas generator 30 receives a portion of the oxidizer and fuel and combusts the oxidizer and fuel to operate the turbine, and the fuel and oxidizer that are not supplied to the gas generator are sent to the thrust chamber to generate thrust.

In this case, such as a hydrogen engine or a methane engine, in an engine in which a fuel is vaporized when the fuel is heated in a regenerative cooling channel and an expansion-type cycle is possible, the gas generator is not necessary, and thus, a system is simple and engine efficiency (specific thrust) increases.

However, the conventional turbopump requires a pipe connecting an oxidizer tank and a fuel tank to the turbopump, and a pipe connecting the turbopump to an injector manifold located in a combustor head portion of the thrust chamber, and thus, volume and weight of the turbopump increase, a manufacturing thereof is complicated, and management for preventing leakage of a fluid is cumbersome.

In addition, the oxidizer pump and the fuel pump are operated by one shaft, and thus, a system for blocking a possibility of mixing of the two propellants, for example, an IPS purge system, or the like is required additionally.

Therefore, there is an urgent need to develop a turbopump that can make a rocket engine lighter.

The above-mentioned background art is technical information possessed by the inventor for the derivation of the present disclosure or acquired in the process of derivation of the present disclosure, and cannot necessarily be said to be a known technique disclosed to the general public prior to the filing of the present disclosure.

SUMMARY

The present disclosure is made to solve the above problems, and an object of the present disclosure is to provide a rocket engine with an integrated combustor head and turbopump capable of minimizing weight and volume of a turbopump and increasing convenience of management.

Meanwhile, an object of the present disclosure is not limited to the object mentioned above, and other objects not mentioned will be clearly understood from descriptions below.

According to an aspect of the present disclosure, there is provided a rocket engine with an integrated combustor head and turbopump, including: an oxidizer supply pipe portion through which an oxidizer is transported; a fuel supply pipe portion through which a fuel is transported; an oxidizer manifold to which the oxidizer vaporized from the oxidizer supply pipe portion through a regenerative cooling channel is supplied; a fuel manifold to which the fuel vaporized from the fuel supply pipe portion through a regenerative cooling channel is supplied; an oxidizer turbine provided at a front end of the oxidizer manifold and rotated by the vaporized oxidizer; a fuel turbine provided at a front end of the fuel manifold and rotated by the vaporized fuel; an oxidizer pump provided inside the oxidizer supply pipe portion, having a rotating shaft coupled to a rotating shaft of the oxidizer turbine to rotate together with the rotating shaft of the oxidizer turbine, and configured to supply the oxidizer inside the oxidizer supply pipe portion to the oxidizer manifold; and a fuel pump provided inside the fuel supply pipe portion, having a rotating shaft coupled to a rotating shaft of the fuel turbine to rotate together with the rotating shaft of the fuel turbine, and configured to supply the fuel inside the fuel supply pipe portion to the fuel manifold.

The rocket engine with an integrated combustor head and turbopump may further include: an injector located below each of the oxidizer manifold and the fuel manifold to inject the vaporized oxidizer and fuel to a lower side; and a combustor to which the vaporized oxidizer and fuel are supplied from the injector and in which the oxidizer and the fuel are combusted.

Each of the rotating shaft of the oxidizer pump and the rotating shaft of the oxidizer turbine may be a first rotating shaft which is the same one rotating shaft, and each of the rotating shaft of the fuel pump and the rotating shaft of the fuel turbine may be a second rotating shaft which is the same one rotating shaft.

In this case, the first rotating shaft and the second rotating shaft may be coupled to each other through a gear, and a ratio of a rotational speed with respect to the each other may be constant.

The combustor may include a plurality of cooling channels coupling a lower end to an upper end of the combustor on a combustion chamber wall, and the rocket engine with an integrated combustor head and turbopump may further include an inlet manifold including an oxidizer inlet manifold coupling a first cooling channel, which is a cooling channel alternately selected among the cooling channels, and the oxidizer supply pipe portion to each other and a fuel inlet manifold coupling a second cooling channel, which is a cooling channel expect for the first cooling channel among the cooling channels, and the fuel supply pipe portion to each other.

The inlet manifold may be formed along a periphery of the combustor, the first cooling channel may communicate with the oxidizer manifold, and the second cooling channel may communicate with the fuel manifold.

DETAILED DESCRIPTION

Before describing a technical idea of the present disclosure in more detail using the accompanying drawings, terms or words used in the present specification should not be construed as being limited to conventional or dictionary meanings, and the terms or words used in the present specification should be construed as meanings and concepts consistent with the technical spirit of the present disclosure based on the principle that the inventor can appropriately define the concept of the term in order to best describe the disclosure.

Therefore, a configuration illustrated in the embodiments and drawings described in the present specification is only one embodiment of the present disclosure and does not represent all of the technical spirit of the present disclosure, and thus, it should be understood that there are various modifications that can be substituted for the configuration at the time of the present application.

Hereinafter, a technical idea of the present disclosure will be described in more detail with reference to the accompanying drawings. Since the accompanying drawings are merely examples illustrated to explain the technical idea of the present disclosure in more detail, the technical idea of the present disclosure is not limited to the accompanying drawings.

Figure 3:
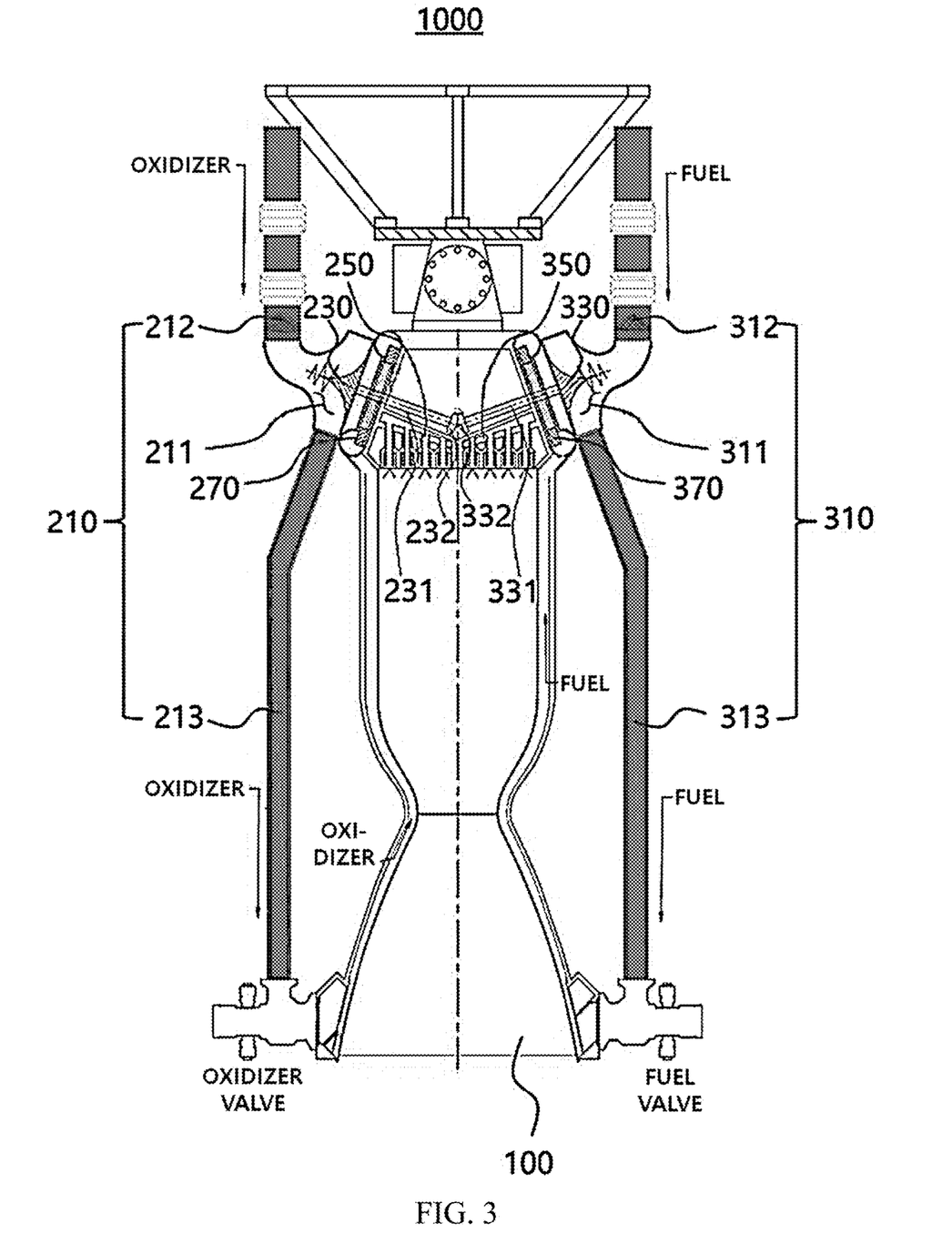
FIG. 3 is a side cross-sectional view of a rocket engine with an integrated combustor head and turbopump according to one embodiment of the present disclosure.

FIG. 3 is a side cross-sectional view of a rocket engine 1000 with an integrated combustor head and turbopump according to one embodiment of the present disclosure.

As illustrated in FIG. 3, the rocket engine 1000 with an integrated combustor head and turbopump according to one embodiment of the present disclosure may include an oxidizer supply pipe portion 210, a fuel supply pipe portion 310, an oxidizer manifold 250, a fuel manifold 350, an oxidizer turbine 270, a fuel turbine 370, an oxidizer pump 230, a fuel pump 330, an injector 120, a combustor head 110, and a combustor 100.

In the present disclosure, an oxidizer and a fuel are supplied together to a combustor 100 and combusted in the combustor 100. The oxidizer and fuel are combusted inside the combustor 100, and thus, a temperature inside the combustor 100 is very high.

The oxidizer supply pipe portion 210 is connected to an oxidizer tank to form a flow path through which the oxidizer is transported. The oxidizer supply pipe portion 210 largely includes three portions, that is, an oxidizer pump casing 211 which is formed in contact with one side of a combustor head 110 and includes two ports, a first oxidizer supply pipe 212 which couples one port in the oxidizer pump casing 211 and the oxidizer tank to each other, and a second oxidizer supply pipe 213 which couples the other port of the oxidizer pump casing 211 and an oxidizer inlet manifold 141 to be described below to each other.

For reference, the oxidizer pump casing 211 is formed separately without communicating with an internal space of the combustor head 110.

The fuel supply pipe portion 310 forms a flow path to which a fuel tank is coupled and through which the fuel is transported. The fuel supply pipe portion 310 is also divided into three portions, that is, a fuel pump casing 311, a first fuel supply pipe 312, and a second fuel supply pipe 313, and the shape of each portion is the same as each portion of the oxidizer supply pipe portion 210 described above. However, one end of the first fuel supply pipe 312 is coupled to the fuel tank and the other end thereof is coupled to one port formed in the fuel pump casing 311, and one end of the second fuel supply pipe 313 is coupled to the fuel pump casing 311 and the other end thereof is coupled to a fuel inlet manifold 142 to be described below.

The oxidizer pump 230 is provided inside the oxidizer pump casing 211. In this case, a rotating shaft of the oxidizer pump 230 is arranged in a horizontal direction with respect to one port to which the first oxidizer supply pipe 212 is coupled in the ports formed in the oxidizer pump casing 211, and is perpendicular to the other port. Therefore, the oxidizer introduced through the port to which the first oxidizer supply pipe 212 is coupled is vertically introduced with respect to pump blades included in the oxidizer pump 230, and the oxidizer discharged through the port to which the second oxidizer supply pipe 213 is coupled is smoothly discharged by the centrifugal force of the blades of the pump 230.

The fuel pump 330 is also provided in the fuel pump casing 311, and a rotating shaft of the fuel pump 330 arranged in the horizontal direction with respect to one port to which the first fuel supply pipe 312 is coupled in the ports formed in the fuel pump casing 311, and is perpendicular to the other port. Therefore, as the fuel pump 330 rotates, the fuel is introduced through the port to which the first fuel supply pipe 312 is coupled and the fuel is discharged through the other port.

Figure 4:
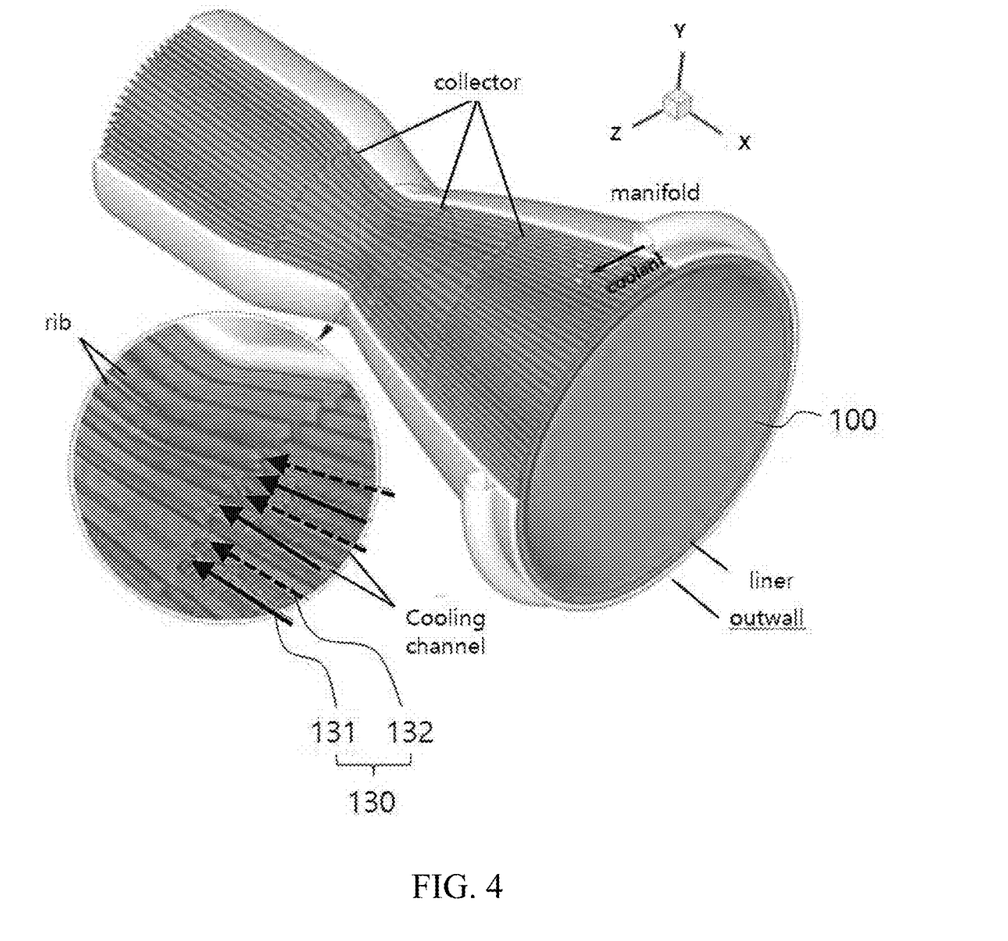
FIG. 4 is a perspective view illustrating a combustor regenerative cooling channel of the rocket engine with an integrated combustor head and turbopump according to an embodiment of the present disclosure.
Figure 5:
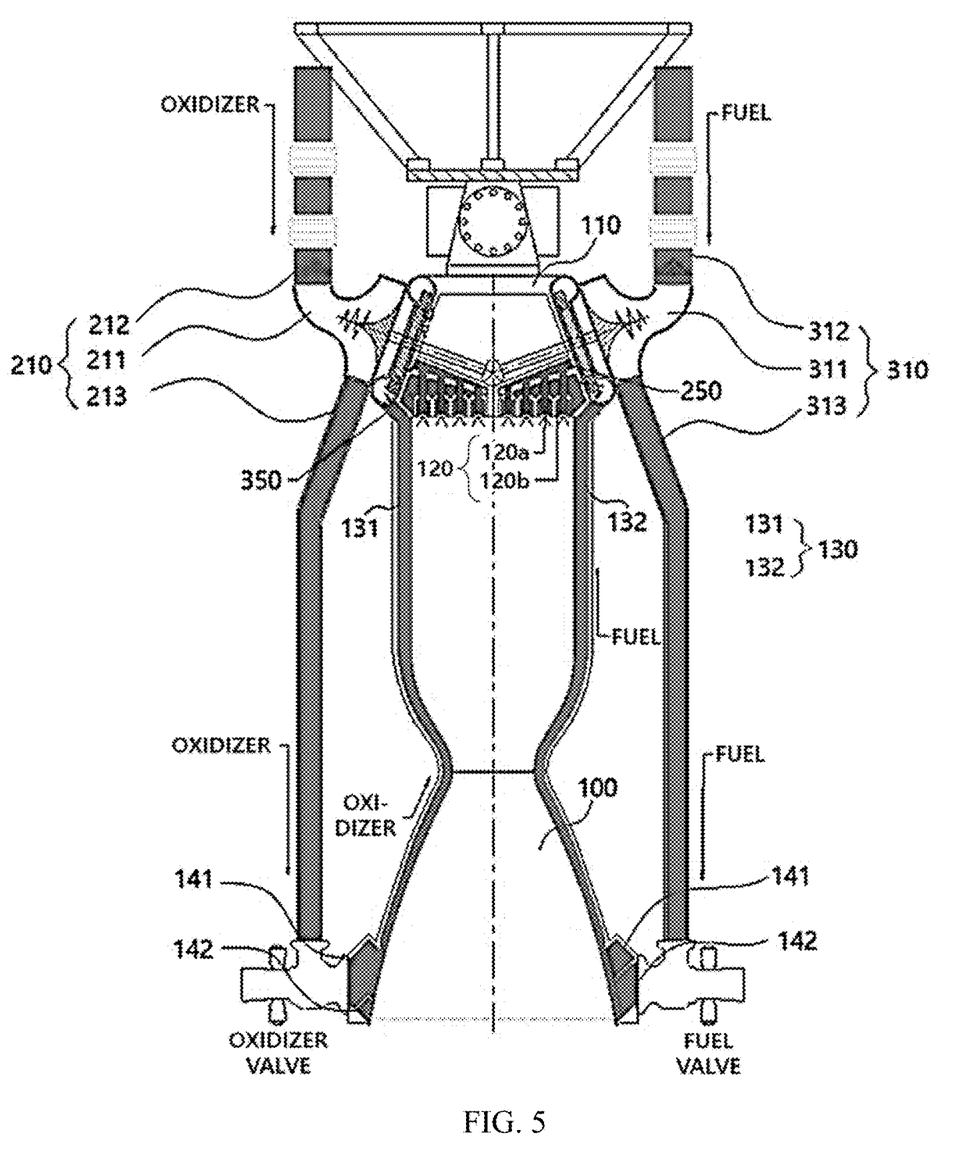
FIG. 5 is a side cross-sectional view illustrating a state in which an oxidizer and a fuel are injected into a combustor of the rocket engine with an integrated combustor head and turbopump according to one embodiment of the present disclosure.

FIG. 4 is a perspective view illustrating a combustor regenerative cooling channel of the rocket engine with an integrated combustor head and turbopump according to an embodiment of the present disclosure, and FIG. 5 is a side cross-sectional view illustrating a state in which the oxidizer and the fuel are injected into the combustor of the rocket engine with an integrated combustor head and turbopump according to one embodiment of the present disclosure.

The combustor 100 will be described with reference to FIGS. 4 and 5. As described, in the combustor 100, the oxidizer and fuel are supplied into the combustion chamber and combusted.

Unlike a general combustor 100, the combustor 100 of the rocket engine 1000 with an integrated combustor head and turbopump according to one embodiment of the present disclosure includes both a cooling channel 130 and an inlet manifold 140 in order to maximize cooling of the combustion chamber.

The fuel supplied from the oxidizer supply pipe portion 210 and the fuel supply pipe portion 310 is transported to the combustor head 110 side through the cooling channel 130, and thus, the combustor is cooled. To this end, the cooling channels 130 extend from a lower end to an upper end of the combustor 100 along a combustion chamber wall, and a plurality of cooling channels 130 are provided along a periphery of the combustor 100.

The inlet manifold 140 is configured to couple the above-described oxidizer supply pipe portion 210 and fuel supply pipe portion 310 to the cooling channel 130. The inlet manifold 140 is formed along the periphery of the combustor at the lower end of the combustor, and an inner space of the inlet manifold 140 is divided into an oxidizer inlet manifold 141 and a fuel inlet manifold 142.

The oxidizer inlet manifold 141 is formed to couple a first cooling channel 131, which is an alternately selected cooling channel among the cooling channels inside the inlet manifold 140, and the second oxidizer supply pipe 213 to each other. That is, the second oxidizer supply pipe 213 is coupled to the inlet manifold 140, and thus, the second oxidizer supply pipe 213 and the oxidizer inlet manifold 141 communicate with each other. In addition, the oxidizer inlet manifold 141 may communicate with the first cooling channel 131 again. In addition, the fuel inlet manifold 142 is formed to couple a second cooling channel 132 which is a cooling channel except for the first cooling channel among the cooling channels and the second fuel supply pipe 313 to each other. Accordingly, the second fuel supply pipe 313, the fuel inlet manifold 142, and the second cooling channel 132 may communicate with each other.

In this case, a separate valve may be provided at a portion where each of the second oxidizer supply pipe 213 and the second fuel supply pipe 313 is coupled to the inlet manifold 140 to restrict the flow of the oxidizer and fuel. For reference, FIG. 3 illustrates a case in which the valve is closed, and FIG. 5 illustrates a state in which the valve is opened. Moreover, in FIG. 5, a flow path of the oxidizer is illustrated from the upper left to the lower end, and the flow path of the fuel is illustrated from the upper right to the lower end.

That is, the inlet manifold 140 of the rocket engine 1000 with an integrated combustor head and turbopump according to one embodiment of the present disclosure receives the oxidizer and the fuel, which are introduced from the second oxidizer supply pipe 213 and the second fuel supply pipe 313, through the oxidizer inlet manifold 141 and the fuel inlet manifold 142, and the oxidizer and fuel are transported to the first cooling channel 131 and the second cooling channel 132 again to cool the combustor 100. In this case, the oxidizer is circulated through the first cooling channel 131 and the fuel is circulated through the second cooling channel 132, and thus, the oxidizer and the fuel flow to be alternately disposed. Accordingly, compared with when one type of propellant is used, sufficient cooling performance is realized, there is no need to use membrane cooling, and there is no propellant inlet and outlet in the middle of the regenerative cooling channel to prevent overheating of a specific area. In addition, both the oxidizer and the fuel are heated and pressurized to easily become gaseous while flowing through the cooling channel 130, and thus, it is possible to increase engine combustion efficiency.

In addition, since there is no need to use a separate heat exchanger for each of the oxidizer and fuel, the weight of the engine can be greatly reduced. Moreover, the oxidizer or fuel is not concentrated on a specific portion of the combustion chamber wall because the cooling channel is alternately formed throughout the combustion chamber wall, the oxidizer or fuel can flow to be evenly distributed, and thus, a uniform cooling effect can be exerted.

The oxidizer and fuel that have passed through the cooling channel 130 are vaporized by heat inside the combustion chamber and are supplied to the oxidizer manifold 250 and the fuel manifold 350 of the combustor head 110 located above the combustor 100.

Meanwhile, the injector 120 is provided at an inner lower end portion of the combustor head 110. The injector 120 is positioned below the oxidizer manifold 250 and the fuel manifold 350 to inject the vaporized oxidizer and fuel downward. For reference, the injector coupled to the oxidizer manifold 250 is an oxidizer injector 120a, and the injector coupled to the fuel manifold 350 is a fuel injector 120b.

Referring back to FIG. 3, the oxidizer manifold 250 receives the oxidizer from the first cooling channel 131 as described above, the oxidizer moving along the cooling channel is heated and vaporized through heat exchange with the combustor 100, and thus, the vaporized oxidizer moves to the oxidizer turbine 270. In this case, the vaporized oxidizer is supplied to the oxidizer manifold 250 after driving the oxidizer turbine 270.

As described above, the fuel manifold 350 also receives the fuel from the second cooling channel 132, the fuel moving along the second cooling channel 132 is heated and vaporized through heat exchange with the combustor 100, and the vaporized fuel moves to the fuel turbine 370. The vaporized fuel is also supplied to the fuel manifold 350 after driving the fuel turbine 370.

For reference, each of the oxidizer manifold 250 and the fuel manifold 350 is located on the combustor head 110, that is, on the upper side of the injector 120 in the combustor 100, and the oxidizer and fuel are injected into the combustor 100 through an injection port formed in the injector 120.

As illustrated in FIG. 5, the above-described oxidizer manifold 250 and fuel manifold 350 are partitioned from each other. This is because combustion occurs when the oxidizer and the fuel are mixed with each other, and thus the oxidizer and the fuel should be separated, and the oxidizer and the fuel are mixed and combusted in the combustion chamber inside the combustor 100, and used as a propulsion power of a projectile.

The oxidizer turbine 270 is provided at a front end of the oxidizer manifold 250, more precisely, between the first cooling channel 131 and the oxidizer manifold 250, and is rotated by the oxidizer which passes through the first cooling channel 131 and is vaporized. The rotating shaft of the oxidizer turbine 270 may be installed to face the above-described oxidizer pump casing 211 side.

The fuel turbine 370 is provided at a front end of the fuel manifold 350, more precisely, between the second cooling channel 132 and the fuel manifold 350, and is rotated by the fuel which passes through the second cooling channel 132 and is vaporized. The rotating shaft of the fuel turbine 370 may be installed to face the fuel pump casing 311 as described above.

A rotating shaft of the oxidizer pump 230 provided inside the oxidizer supply pipe portion 210 is coupled to the rotating shaft of the oxidizer turbine 270, and thus, the oxidizer pump 230 is rotated together with the oxidizer turbine 270. The oxidizer stored in the oxidizer tank through the oxidizer pump 230 is supplied to the oxidizer manifold 250 through the oxidizer supply pipe portion 210, the first cooling channel 131, and the oxidizer turbine 270.

The fuel pump 330 is also provided inside the fuel supply pipe portion 310, a rotating shaft of the fuel pump 330 is coupled to the rotating shaft of the fuel turbine 370, and thus, the fuel pump 330 is rotated together with the fuel turbine 370. The fuel stored in the fuel tank through the fuel pump 330 is supplied to the fuel manifold 350 through the fuel supply pipe portion 310, the fuel turbine 370, and the second cooling channel 132.

According to the present disclosure, the oxidizer pump 230 and the fuel pump 330 are interlocked with the oxidizer turbine 270 and the fuel turbine 370, respectively, and are located in the oxidizer supply pipe portion 210 and the fuel supply pipe portion 310, and thus, it is possible to reduce the size of the rocket engine 1000 with an integrated combustor head and turbopump. In addition, it is possible to obtain a structure that simplifies the manufacture of the turbopump and reduces the weight by removing the pipe located in the turbo pump and the pipe which comes out of the turbo pump and is located in the injector 120 of the combustor head portion in the related art.

For convenience of explanation, each of the rotating shaft of the oxidizer pump 230 and the rotating shaft of the oxidizer turbine is defined as a first rotating shaft which is the same one rotating shaft, and each of the rotating shaft 331 of the fuel pump 330 and the rotating shaft of the fuel turbine 370 is defined as a second rotating shaft which is the same one rotating shaft. The first rotating shaft 231 and the second rotating shaft 331 may be coupled to each other inside the combustor head 110 through the gears 232 and 332. Here, the gears 232 and 332 may be gears connecting the first rotating shaft 231 and the second rotating shaft 331 so that rotating bodies extending in two different directions, such as a velvet gear, rotates at a specific gear ratio. In the present disclosure, according to the structures of the gears 232 and 332 coupling the first rotating shaft 231 and the second rotating shaft 331 to each other, a constant ratio of the rotational speed to each other is obtained so that a combustion mixing ratio between the oxidizer and the fuel is maintained, and thus, it is possible to prevent the combustor 100 from melting or being unstably driven due to oversupply of the oxidizer or fuel to any one of the oxidizer turbine 270 and the fuel turbine 370.

In addition, compared with a general turbopump in which the oxidizer pump 230 and the fuel pump 330 are completely separated from each other and the oxidizer pump 230 and the fuel pump 330 are operated by one shaft, in the present disclosure, it is possible to prevent the possibility that the oxidizer and fuel are mixed with each other in an IPS purge system.

In the rocket engine 1000 with an integrated combustor head and turbopump according to one embodiment of the present disclosure, the entire rocket engine 1000, or at least the combustor 100, the cooling channel 130, the combustor head 110, and the injector 120 may be integrally formed by additive manufacturing.

More specifically, in the conventional machining, an inner wall of the combustor is milled to divide the channel, and then the outer jacket is put on and subjected to brazing. However, in this process, it is very difficult to manufacture because the positions of the inner wall and the outer jacket had to exactly match. In this situation, it is technically very difficult to additionally form the cooling channel through which the oxidizer as well as the fuel flows in and out.

The rocket engine 1000 with integrated combustor head and turbopump according to one embodiment of the present disclosure may be integrally laminated using 3D printing technology. Accordingly, it is possible to implement the cooling channel, which cannot be realized by conventional machining, having a complex shape in which different refrigerants (oxidizer and fuel) are arranged to extend in the longitudinal direction and alternately arranged in the circumferential direction.

Moreover, unlike the conventional fuel pump and the oxidizer pump in which the fuel pump and the oxidizer pump are complicatedly and mechanically connected to the same turbine, it is possible to configure an expansion-type cycle in which each pump uses a different turbine. Accordingly, the connection configuration between the pump and the turbine can be simplified. In addition, a heated gas propellant for pressurization is supplied to the fuel tank to perform self-vapor pressurization, and thus, it is not necessary to use the heat exchanger of the engine. Therefore, the weight of the engine can be greatly reduced and reliability of the entire device can increase.

In the rocket engine with an integrated combustor head and turbopump according to the above configuration, the turbopump casing simultaneously serves as a thrust support unit of the combustor head portion, and thus, it is possible to reduce the weight of the combustor head portion.

In addition, the turbopump and the combustor are disposed to be closest to each other, and thus, it is possible to minimize the weight and volume of the coupling pipe.

In addition, a pipe for driving a turbine and a pipe introduced from the turbine to a combustor mixing head in the conventional combustor are manufactured integrally with the combustor head portion. Accordingly, it is possible to reduce a manufacturing cost and prevent leakage of the coupling portion, additional assembly effort is reduced, reliability increases, an assembly cost is reduced, and a manufacturing speed increases.

Moreover, it is possible to maintain a constant combustion mixing ratio through the gear coupling the first and second rotating shafts to each other.

Further, it is possible to maximize the efficiency of the turbopump by adjusting the speeds of the first and second rotating shafts through a gear ratio.

Moreover, since the oxidizer and the fuel are heated as the oxidizer and the fuel flow through the cooling channel, a separate heat exchanger is not required in the combustor.

In addition, since the oxidizer and the fuel are injected into the combustion chamber in a gaseous state to be combusted, it is possible to maximize combustion efficiency.

In addition, since there is no need to dispose the turbopump assembly next to the combustor, the volume of the engine assembly is minimized, and thus, the disposition and maintenance of a clustering engine assembly using a plurality of engines together are easily performed.

The technical idea should not be construed as being limited to the above-described embodiments of the present disclosure. Application of the present disclosure is various and various modifications can be made at the level of those skilled in the art without departing from a gist of the present disclosure. Accordingly, the improvements and modifications fall within a protection scope of the present disclosure as long as it is apparent to those skilled in the art.

DETAILED DESCRIPTION OF MAIN ELEMENTS

100: combustor
110: combustor head
120: injector
130: cooling channel
131: first cooling channel
132: second cooling channel
140: inlet manifold
141: oxidizer inlet manifold
142: fuel inlet manifold
210: oxidizer supply pipe portion
211: oxidizer pump casing
212: first oxidizer supply pipe
213: second oxidizer supply pipe
230: oxidizer pump
231: first rotating shaft
232: gear 250: oxidizer manifold
270: oxidizer turbine
310: fuel supply piping part
311: fuel pump casing
312: first fuel supply pipe
313: second fuel supply pipe
330: fuel pump
331: second rotating shaft
332: gear
350: fuel manifold
370: fuel turbine

The invention claimed is:

1. A rocket engine with an integrated combustor head and turbopump, comprising:
an oxidizer supply pipe portion through which an oxidizer is transported;
a fuel supply pipe portion through which a fuel is transported;
an oxidizer manifold to which the oxidizer vaporized from the oxidizer supply pipe portion is supplied;
a fuel manifold to which the fuel vaporized from the fuel supply pipe portion is supplied;
an oxidizer turbine provided at a front end of the oxidizer manifold and rotated by the vaporized oxidizer;
a fuel turbine provided at a front end of the fuel manifold and rotated by the vaporized fuel;
an oxidizer pump provided inside the oxidizer supply pipe portion, having a rotating shaft coupled to a rotating shaft of the oxidizer turbine to rotate together with the rotating shaft of the oxidizer turbine, and configured to supply the oxidizer inside the oxidizer supply pipe portion to the oxidizer manifold; and
a fuel pump provided inside the fuel supply pipe portion, having a rotating shaft coupled to a rotating shaft of the fuel turbine to rotate together with the rotating shaft of the fuel turbine, and configured to supply the fuel inside the fuel supply pipe portion to the fuel manifold,
wherein the rotating shaft of the oxidizer pump and the rotating shaft of the oxidizer turbine form a unitary first rotating shaft,
wherein the rotating shaft of the fuel pump and the rotating shaft of the fuel turbine form a unitary second rotating shaft, and
wherein the first rotating shaft and the second rotating shaft are coupled to each other through a gear, and a ratio of rotational speeds between the first and second shafts is constant.

2. The rocket engine with an integrated combustor head and turbopump of claim 1, further comprising:
an injector located below each of the oxidizer manifold and the fuel manifold to inject the vaporized oxidizer and fuel to a lower side; and
a combustor to which the vaporized oxidizer and fuel are supplied from the injector and in which the oxidizer and the fuel are combusted.

3. The rocket engine with an integrated combustor head and turbopump of claim 2,
wherein the combustor
includes a plurality of cooling channels coupling a lower end to an upper end of the combustor on a combustion chamber wall;
and further comprises
an inlet manifold including an oxidizer inlet manifold coupling a first cooling channel selected among the cooling channels and the oxidizer supply pipe portion; and a fuel inlet manifold coupling a second cooling channel alternately selected with the first cooling channel among the cooling channels, and the fuel supply portion.

4. The rocket engine with an integrated combustor head and turbopump of claim 3,
the inlet manifold is formed along a periphery of the combustor,
the first cooling channel communicates with the oxidizer manifold, and
the second cooling channel communicates with the fuel manifold.

* * * * *